US009171509B2

(12) United States Patent
McRae

(10) Patent No.: US 9,171,509 B2
(45) Date of Patent: Oct. 27, 2015

(54) SINGLE BACKLIGHT SOURCE WHERE THE BACKLIGHT EMITS PURE COLORED LIGHT IN A SEQUENTIAL MANNER WHERE THE SEQUENCE IS RED, BLUE AND GREEN

(71) Applicant: Vizio Inc., Irvine, CA (US)

(72) Inventor: Matthew McRae, Irvine, CA (US)

(73) Assignee: Vizio Inc., Irvine, CA (US)

( * ) Notice: Subject to any disclaimer, the term of this patent is extended or adjusted under 35 U.S.C. 154(b) by 81 days.

(21) Appl. No.: 13/866,355

(22) Filed: Apr. 19, 2013

(65) Prior Publication Data

US 2014/0313425 A1 Oct. 23, 2014

(51) Int. Cl.

*G09G 3/36* (2006.01)
*H04N 9/12* (2006.01)
*G09G 3/34* (2006.01)

(52) U.S. Cl.

CPC ............ *G09G 3/3607* (2013.01); *G09G 3/3406* (2013.01)

(58) Field of Classification Search

CPC ........................... G09G 3/3607; G09G 3/3406
See application file for complete search history.

(56) References Cited

U.S. PATENT DOCUMENTS 5,260,625 A 11/1993 Holden et al.
7,057,790 B2 6/2006 Selbrede
7,293,907 B2 11/2007 Kim et al.
7,344,292 B2 3/2008 Kim
7,948,469 B2 * 5/2011 Kitaoka et al. ................ 345/102
8,259,258 B2 9/2012 Gorog et al.
2008/0122874 A1 * 5/2008 Han et al. ...................... 345/690
2008/0165103 A1 * 7/2008 Lee ................................ 345/88
2008/0198114 A1 8/2008 Roberts et al.
2010/0060820 A1 3/2010 Kleppinger et al.
2010/0123839 A1 5/2010 Lu
2010/0165001 A1 7/2010 Savvateev et al.
2010/0208041 A1 8/2010 Savvateev et al.
2011/0134021 A1 * 6/2011 Schmitz et al. ................. 345/83
2012/0001954 A1 * 1/2012 Yamazaki et al. ............ 345/690

FOREIGN PATENT DOCUMENTS

EP 2337014 6/2011

* cited by examiner

*Primary Examiner* — Andrew Sasinowski
(74) *Attorney, Agent, or Firm* — Law Office of Scott C. Harris, Inc.

(57) ABSTRACT

A display system, having an emissive body, varying light emitted from the surface so that different temporally adjacent time periods see the emissive body outputting different primary colors. A liquid crystal display can then modulate the different primary colors that have been output at different times. In one embodiment, the different times modulate red green and blue colors. In another embodiment, the different times modulate red green blue and white colors. The emissive body can be a FIPEL type device. Light can be both color varied and also color temperature controlled. The light color is changed by changing a frequency used to drive the body.

36 Claims, 7 Drawing Sheets

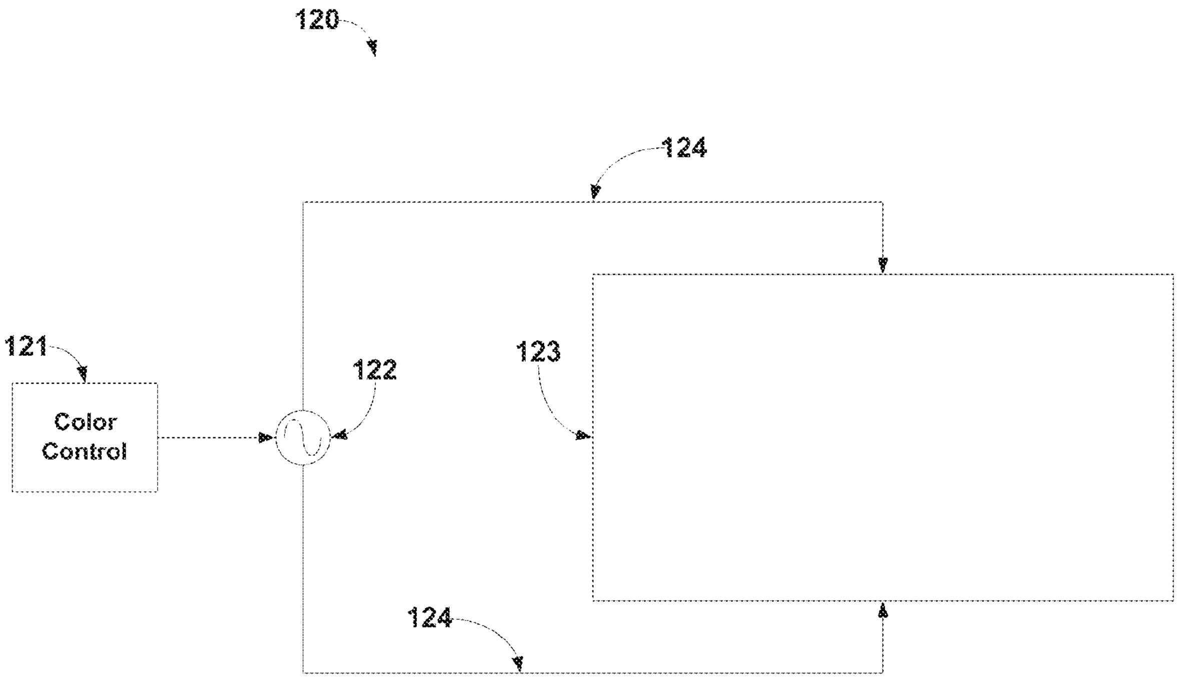
Figure 12 – Single FIPEL Backlight Color Control

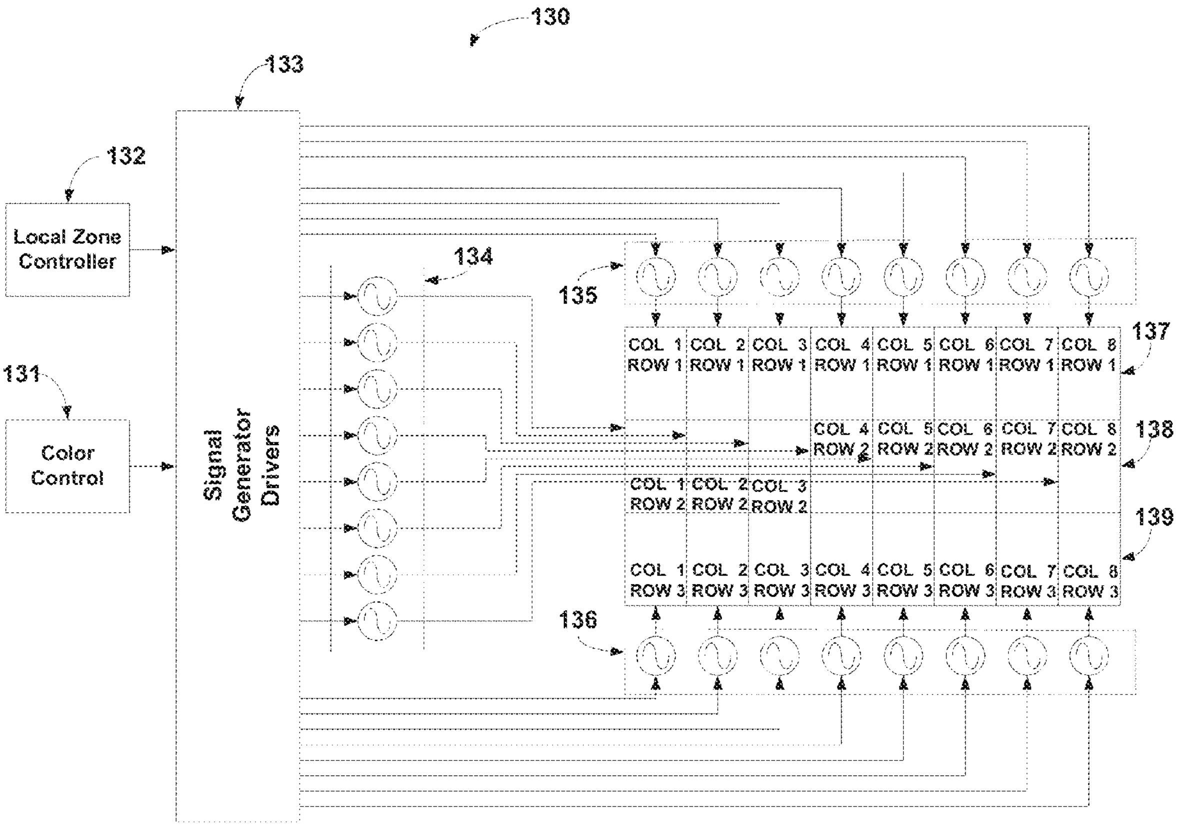
Figure 13 - FIPEL Row & Col Color Control Panel Back View

SINGLE BACKLIGHT SOURCE WHERE THE BACKLIGHT EMITS PURE COLORED LIGHT IN A SEQUENTIAL MANNER WHERE THE SEQUENCE IS RED, BLUE AND GREEN

BACKGROUND

From their first introduction, digital display panels have required huge numbers of components. The typical high definition display panel contains 1,080 "pixel groups" horizontally and 1,920 "pixel groups vertically. Each pixel group contains 3 actual pixels where one is red, one is green and one is blue. When all three sub-pixels are "on", three colors are passed through the pixel gates which the eye perceives as coming from a single point source of light that appears white.

In total there are, for a standard high definition display, 2,073,600 pixel groups with 6,220,800 individual sub-pixels with dozens of thin film transistors, resistors and capacitors to control each sub-pixel.

Current LCD display panels for television, computer monitors and other display applications are generally constructed with each pixel actually consisting of three sub-pixels. Each of the sub-pixels have a color filter fixed behind the sub-pixel. The color filter generally is a film with areas of a primary color. These are red, blue and green. A white light backlight continuously emits light that passes through a diffusor, a polarizer and the color film.

A high definition display screen that displays 1080 columns and 1920 rows contains 2,073,600 pixel groups with three pixels per group for a total of 6,220,800 sub-pixels. Each of the sub-pixels is connected to a driver circuit that consists of transistors, capacitors and resistors.

Indium tin oxide or ITO is generally used to interconnect all of these components together. The complexity of constructing a panel with the magnitude of modern panels speaks to the outstanding abilities of modern process engineering.

LCD panel assemblies require that light emitted from the back light be diffused, polarized then passed through a color filter film with colored microscopic dots aligned with the sub-pixels in the LCD panel. The pixels in a LCD panel are composed of 3 sub-pixels each of which is addressable by a column and row multiplexer which has to address some 6,220,800 sub-pixels. These sub-pixels are each supported by at least a dozen discreet components comprised of Thin Film Transistors, capacitors and resistors. Control circuitry laid out on the LCD panel substrates are connected through thousands of traces.

SUMMARY

The present invention is intended to substantially reduce the number of components up to and including ⅔rds of the sub-pixel in the LCD panel along with their share of the control circuits and traces.

The inventors recognized that a display with one pixel instead of three sub-pixel groups and a backlight that can display the three primary colors in sequence so that a single pixel can display combinations of color. This will result in a reduction of parts in the display panel by ⅔rds.

BRIEF DESCRIPTION OF THE DRAWINGS

FIG. 12 is a depiction of a single FIPEL backlight panel with it associated color control logic and signal generator for powering the panel.

FIG. 13 is a depiction of a multi-segmented FIPEL backlight panel with 24 FIPEL backlight panels, associated color control logic, local zone control logic, signal generator driver logic and signal generators.

DETAILED DESCRIPTION

The present invention uses a lighting technology called Field Induced Polymer ElectroLumuinescence, referred to as FIPEL lighting. The present invention uses a lighting technology called Field Induced Polymer ElectroLumuinescence, referred to as FIPEL lighting.

Figure 5:
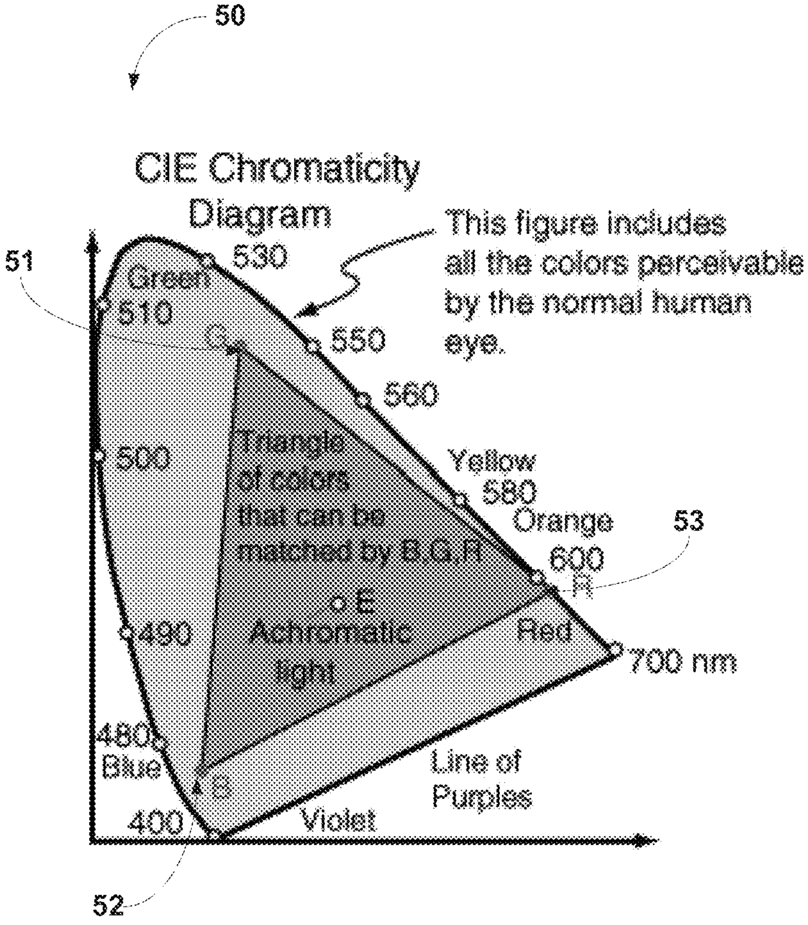
FIG. 5 is a depiction of the CIE color index with a triangle bounding the colors that are specified by the NTSC standard for television.

FIG. 5 shows the CIE chromaticity diagram. Note that 51, 52 and 53 point to the vertices Green (51), Blue (52) and Red (53). The three X,Y coordinates form a triangle that is the color space used for NTSC color television displays. Each of the point index values are 8 bits. Together they make up the 24 bit color used for standard analog and digital color televisions.

The inventor recognized that FIPEL panels have the distinguishing feature of being able to emit colored light from any point on the CIE index bound by the triangle shown in FIG. 5 by appropriate selection of parameters used to drive the signal generator 5. An embodiment makes use of this feature of FIPEL light panels by sequentially emitting light in pure colors of red, blue and green. Another embodiment uses the addition of pure white light. Each color is emitted for a specified period of time during which the pixels contained within the LCD display panel are turned on. Persistence of the human eye will, after all three colors have been emitted, will perceive colors from individual pixels that have emitted pure colored light during two or more sequential phases of the FIPEL backlight.

Since the FIPEL backlight can emit single colors contained on the CIE color index, each FIPEL area becomes a single controlled pixel Only one third of the number of sub-pixels pixels normally found on a LCD display panel are necessary.

This results in a reduced component count, reduced number of circuits and driver lines necessary on a LCD display panel substrate. It also provides the opportunity to reduce the amount of power necessary to operate the LCD display screen.

Another advantage of the disclosed embodiments is that white balance is included with management of individual pixels. White balance becomes an offset to the color of light being emitted from each individual pixel.

In a preferred embodiment, the FIPEL backlight panel will emit three basic light colors in a sequential fashion at different times.

In another embodiment the FIPEL backlight panel will emit Red, Blue, Green and White light in a sequential fashion. This allows the LCD panel to pass through pure white light instead of three composite colors necessary for white light.

Figure 1:
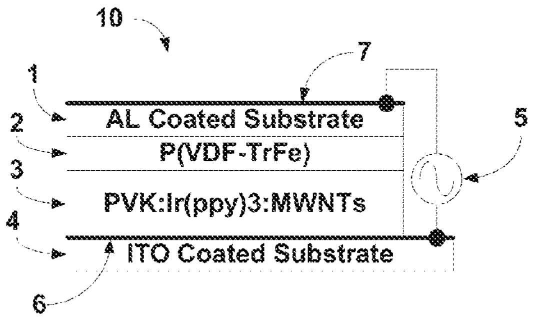
FIG. 1 is a depiction of an asymmetrical (single dielectric layer) FIPEL device that emits light from one surface.
Figure 2:
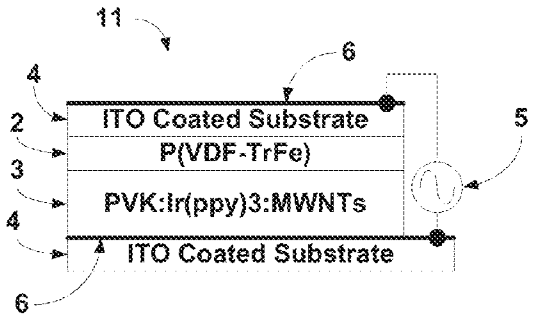
FIG. 2 is a depiction of an asymmetrical (single dielectric layer) FIPEL device that emits light from two surfaces.

To appreciate the simplicity of FIPEL devices reference FIGS. 1 and 2.

FIGS. 1 and 2 illustrate single dielectric FIPEL devices. The basic construction of these FIPEL devices is discussed in the following.

Lab quality FIPEL devices are generally fabricated on glass or suitable plastic substrates with various coatings such as aluminum and Indium tin oxide (ITO). ITO is a widely used transparent conducting oxide because of its two chief properties, it is electrical conductive and optical transparent, as well as the ease with which it can be deposited as a thin film onto substrates. Because of this, ITO is used for conducting traces on the substrates of most LCD display screens. As with all transparent conducting films, a compromise must be made between conductivity and transparency, since increasing the thickness increases the concentration of charge carriers which in turn increases the material's conductivity, but decreases its transparency. The ITO coating used for the lab devices discussed here is approximately 100 nm in thickness. In FIG. 1, emissive side substrate 4 is coated with ITO coating 6 residing against PVK layer 3. In FIG. 2, ITO coating 6 is on both substrates as shown.

Figure 3:
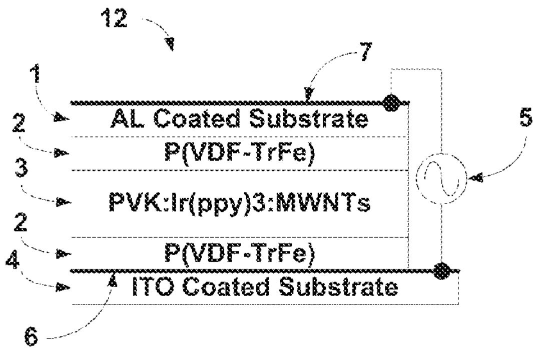
FIG. 3 is a depiction of a symmetrical (two dielectric layers) FIPEL device that emits light from one surface.
Figure 4:
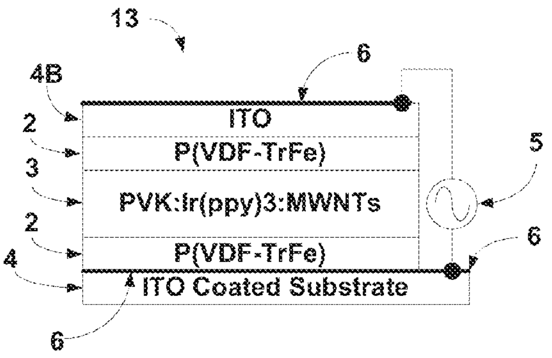
FIG. 4 is a depiction of a symmetrical (two dielectric layers) FIPEL device that emits light from two surfaces.

Substrate 1 in FIGS. 1 and 3 is coated with aluminum (AL) coating 7. The resulting thickness of the AL deposition is sufficient to be optically opaque and reflective. To ensure that any light from emissive layer 3 that travels toward substrate 1 is reflected and directed back through emissive substrate 4 with ITO coating 6 for devices illustrated in FIG. 1. If it is desired that light be emitted through both substrates, a substrate 4 with an ITO coating 6 will be substituted for substrate 1 with AL coating 5 as shown in FIG. 2.

The differences between the two similar substrates is how ITO coating 6 is positioned. In FIG. 1, emissive ITO coating 6 is positioned such that ITO coating 6 on substrate 4 is physically in contact with PVK layer 3. In FIG. 2, substrate 1 with Al coating 7 (FIG. 1) is replaced with substrate 4 with ITO coating 6 not in physical contact with the P(VDF-TrFe) (dielectric layer) layer 2. This allows light to be emitted from both the top and bottom surfaces of the FIPEL device.

Dielectric layer 2 in all cases is composed of a copolymer of P(VDF-TrFE) (51/49%). The dielectric layer is generally spin coated against the non-AL coated 7 side of substrate 1 or non-ITO coated 6 of substrate 4 of the top layer (insulated side). In all cases the dielectric layer is approximately 1,200 nm thick.

Emissive layer 3 is composed of a mix polymer base of poly (N-vinylcarbazole):fac-tris(2-phenylpyri-dine)iridium (III) [PVK:Ir(ppy)3] with Medium Walled Nano Tubes (MWNT). The emissive layer coating is laid onto the dielectric layer to a depth of approximately 200 nm. For the lab devices with the greatest light output the concentration of MWNTs to the polymer mix is approximately 0.04% by weight.

When an alternating current is applied across the devices shown in FIGS. 1 and 2 (asymmetrical devices containing 1 dielectric layer) the emissive layer emits light at specific wavelengths depending on the frequency of the alternating current. The alternating current is applied across the conductive side of the top substrate 1 (Al coating 7) or substrate 4 and the conductive side (ITO coating 6) of bottom substrate 4. Light emission comes from the injection of electrons and holes into the emissive layer. Holes follow the PVK paths in the mixed emissive polymer and electrons follow the MWNTs paths.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

The frequency of the alternating current applied across the substrates of the FIPEL panel can also determine the color of light emitted by the panel. Any index on the CIE can be duplicated by selecting the frequency of the alternating current.

Signal generator 5 may be of a fixed frequency which is set by electronic components or set by a computer process that is software controlled. In this embodiment, the controlling software may be programmed to balance white color or may determine the frequency based on hardware registers or a look up table.

FIG. 5 is a replication of the CIE color index chart. Note that 51, 52 and 53 point to the vertices Green (51), Blue (52) and Red (53). The three X,Y coordinates define the bounds for a triangle that is the color space used for NTSC color television displays. Each of the point index values are 8 bits. Together they make up the 24 bit color used for standard analog and digital color televisions. For the purpose of this discussion, the color of each color being emitted by the FIPEL backlight will be one index point of the pure color plus an offset for white balance of each single color to be emitted.

FIGS. 6 through 9 are depictions of timing diagrams of the operation controlled by a controller or processor that controls the operation, e.g., the color control device 121. The top of each timing diagram shows the periods that events, T0 through T3 are taking place. In these depictions, the differences between T0 and T1 depicts the time period that the color RED will be emitted from the FIPEL panel. Likewise, T1 through T2 depicts the time period that the color Blue will be emitted from the FIPEL panel, and T2 through T3 depicts the time period that the color GREEN will be emitted from the FIPEL panel. As shown in the diagrams, the periods T0-T3 are created one after another and are temporally adjacent to one another.

Figure 6:
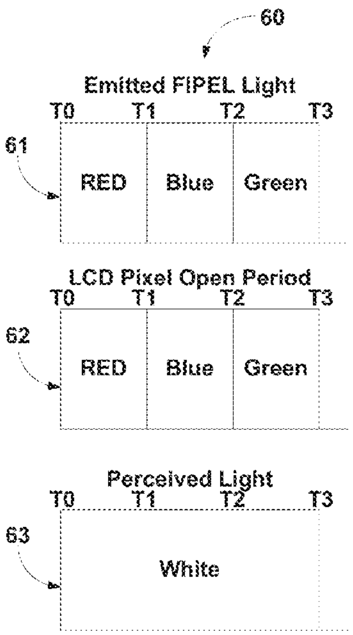
FIG. 6 is a depiction of color sequential light emitted by the FIPEL backlight and the perceived light emitted by an LCD panel.

FIG. 6 is a depiction of a timing diagram where 61 depicts the time periods during which RED, BLUE and Green are emitted from the FIPEL panel. In embodiments, this can be used with or without a separate spatial light modulator, e.g., an LCD panel. The frequency of the periods that the colors change will be different for LCD panels that have different response times for switching pixel gates on and off.

62 depicts the amount of time in each period that the pixel gates are switched on. In this depiction, the gates for a given pixel are on for the same period of time that each sequential color is present.

63 shows the color of light from the LCD panel pixel as it is perceived by the human eye. 63 shows that when the three sequential colors are all passed through the pixel, the perceived color by the eye is white. This effect is achieved because of the persistence of the eye which mixes the three primary colors to appear white.

Figure 7:
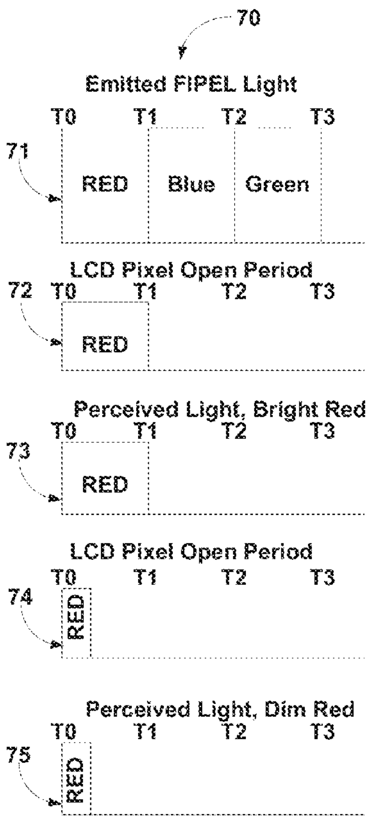
FIG. 7 is a depiction of color sequential light emitted by the FIPEL backlight and the perceived single color light emitted by an LCD panel.

FIG. 7 is a depiction 70 of a timing diagram where a single color can be either bright or dim. 71 shows the timing periods for three sequentially emitted colors of Red, Blue and Green. In this depiction, 72 shows the first period of a pixel gate being turned on for the full period of time (T0-T1) which is the time that Red is being emitted. 73 shows the time period of the Red color light being emitted from the pixel gate. Since the time period of the pixel gate is the same as the time period of the emitted color Red, the perceived light, will be fully saturated Red. FIG. 7 also depicts 74 as the pixel gate being open for a shorter period of time than T0-T1. This shorter time period that the pixel gate is open results in 75 emitting a shorter time period of Red light leaving the pixel gate. In this depiction, the eye receives a smaller overall quantity of light and perceives it as a dim Red color of light.

Figure 8:
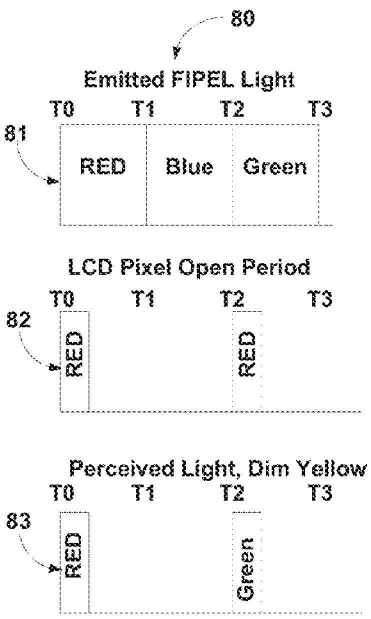
FIG. 8 is a depiction of color sequential light emitted by the FIPEL backlight and the perceived color light emitted by an LCD panel based on two colors of light.

FIG. 8 is a depiction 80 of a timing diagram where two colors are used to produce a third color. 81 shows the time periods for three sequentially emitted colors of Red, Blue and Green. 82 shows that the pixel gate is on for two short time periods, these periods are short periods of T0-T1 (Red) and T2-T3 (Green). Because of the persistence of the human eye the combination of Red light and Green light are perceived as yellow and because the periods of the light are shorter than the complete periods of emitted light by the FIPEL panel, the light that passes through the pixel gate will be perceived as dim.

Figure 9:
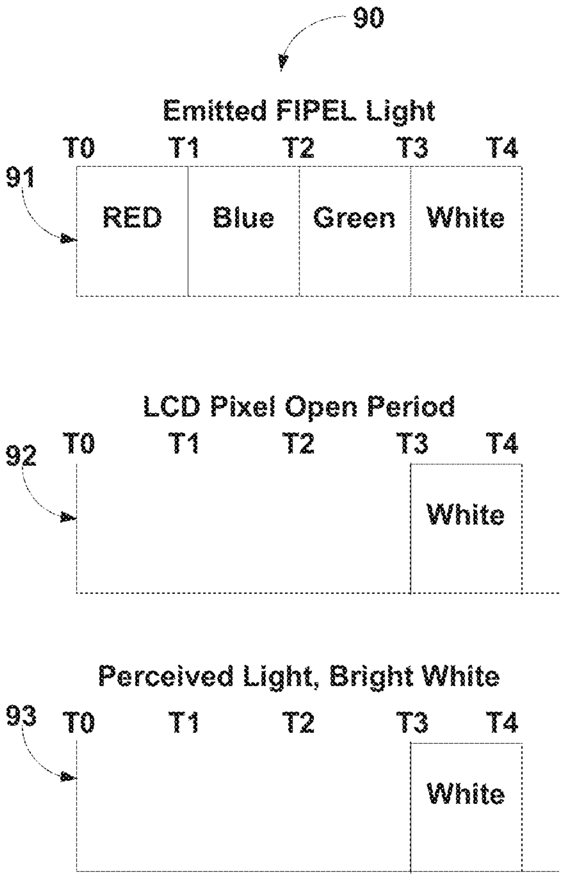
FIG. 9 is a depiction of a four color sequential light emitted by the FIPEL backlight with the perceived color light emitted by an LCD panel being white light.

FIG. 9 is a depiction 90 of a timing diagram where four colors are emitted sequentially by the FIPEL panel. In timing diagram 91, the first three colors are Red, Blue and Green with the forth color being white light. 91 depicts a timing diagram where white light is emitted during the time period of T3-T4. 92 depicts a timing diagram showing the time period where the pixel gate is on, the time period being the same as the time period shown in 91, that being T3-T4. 93 depicts a timing period where the perceived color is bright White. 93 shows the color of light from the LCD panel pixel as it is perceived by the human eye. 93 shows that when pure white light is passed through the pixel the perceived color by the eye is bright white. The perceived light and the brightness is the same as the light perceived in FIG. 6 with the exception being that the time period that the pixel gate remains open is substantially shorter (T3-T4) than that of FIG. 6 where the pixel gate remained open for three time periods (T0-T3).

To fully appreciate the simplification of managing the color emitted with the invention, the current methodology of managing backlight color involves switching different colored LEDs (Red, Blue and Green) on and off for both direct LED backlights and LED edge lit backlight assemblies refer to FIG. 12.

Figure 10:
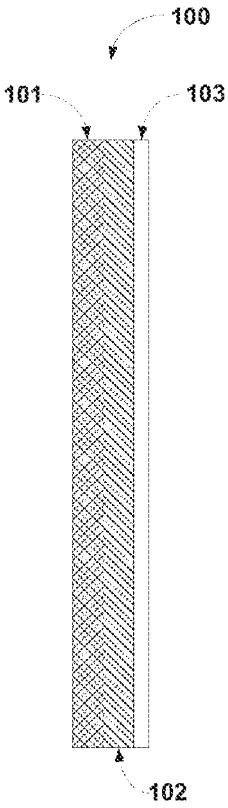
FIG. 10 is a depiction of the edge view of the FIPEL panel, LCD display panel and a polarizer sheet or film to polarize the light leaving the LCD display panel to enhance the viewing experience.
Figure 11:
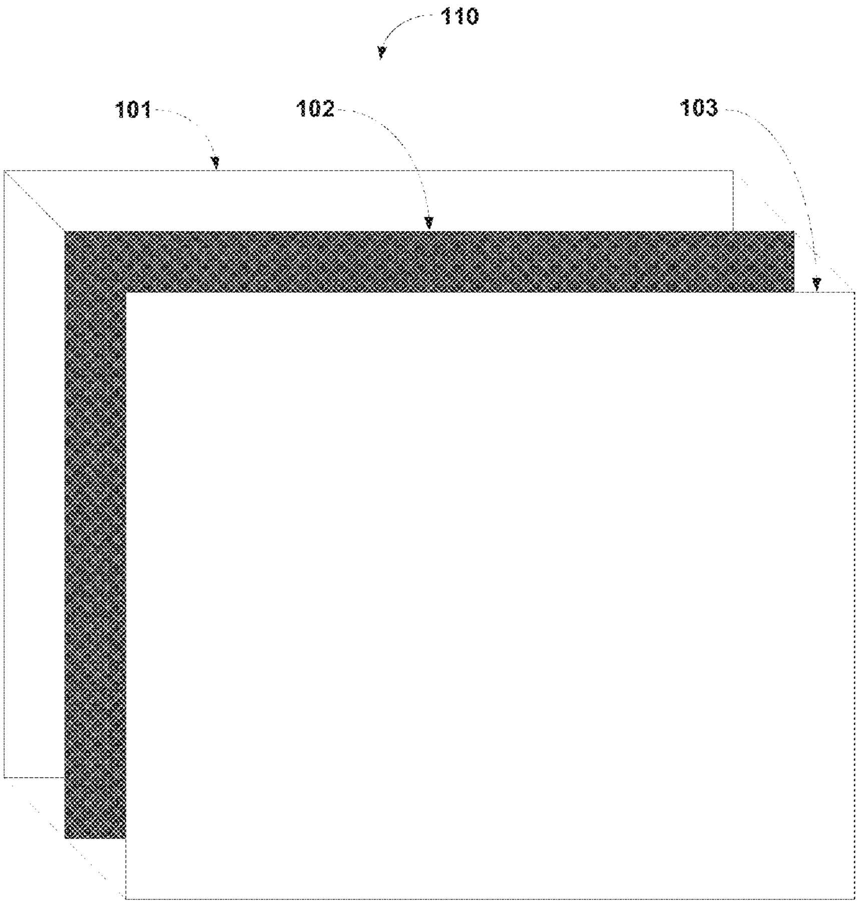
FIG. 11 is a depiction of the front view of the FIPEL panel, LCD display panel and a polarizer sheet or film to polarize the light leaving the LCD display panel to enhance the viewing experience.

Now referring to FIG. 12 where 120 depicts a single FIPEL backlight panel that provides sequential colors to LCD Panel 102 in FIGS. 10 and 11. In this depiction, 121 is a color controller that sends signals to signal generator 122. Color controller 121 receives timing signals (not shown for clarity) from electronics that manage the images sent to LCD panel 102. These signals determine when FIPEL backlight 123 should be emitting each of the primary colors (Red, Blue and Green). Signal generator 122 receives the color signals from color controller 121 and sends the appropriate frequency to FIPEL backlight 123. Each unique frequency send by signal generator 122 via conductors 124 to FIPEL backlight 123. When FIPEL backlight 123 receives a frequency from signal generator 122 the color of light emitted by FIPEL backlight 123 will be specific to that backlight frequency.

FIG. 13 depicts the case where the FIPEL backlight performs zone dimming where the back light is turned off when a frame of content being displayed has black areas that are at least the size of a single zone. In this depiction 130 shows the basic controls to manage the backlight color being emitted and the individual FIPEL backlight panels.

In this depiction, color control 131 manages the color that all of the FIPEL backlight panels for columns 1 through 8 and rows 1 through 3 will emit. Note that in depiction 130, there is a signal generator for each FIPEL panel. For this depiction there are 24 FIPEL panels arranged in groups of 8 which are 137, 138 and 139 and groups of 8 signal generators which are 134, 135 and 136. In this depiction, color controller 131 sends color signals to signal generator drivers 133. These signals tell the signal generator drivers 133 what frequency data to send to each signal generator for generating the proper signal for their corresponding FIPEL panels. Local zone controller 132 sends signals to signal generator drivers 133 which tells signal generator drivers 133 which signal generators to NOT send data to so that individual signal generators do not send power to their corresponding FIPEL panels when those panels are supposed to be off because of local dimming requirements.

Where large numbers of FIPEL backlight panels that need to be individually managed having one signal generator per panel becomes cumbersome to manage. In these cases there may be a signal generator for each FIPEL backlight panel on a horizontal row where a group of signal generators are multiplexed such that each row is powered for a finite period of time much the same as current LCD panels multiplex rows and columns of LCD gates that are turned on and off allowing light to pass through individual light gates.

FIG. 10 is a depiction of the edge view of the FIPEL backlight, LCD display panel and the polarizer sheet or film that polarizes the light traveling through the LCD display panel to enhance the viewing experience. The elements depicted in FIG. 10 are not to scale. In this embodiment, the light being emitted by FIPEL panel 101 is polarized by virtue of emitting substrate 4 in FIG. 1 being a polarized substrate. In another embodiment, a polarized sheet or film may be adhered to the emissive side of substrate 4 of FIG. 1. In either embodiment, the light entering LCD display panel will be polarized so that the maximum amount of light will be passed by each pixel gate which itself is polarized. Polarization sheet or film 103 repolarizes the light leaving the LCD display panel so that it is correctly aligned to enhance the viewing experience.

FIG. 11 is a depiction of the front view of the FIPEL backlight, LCD display panel and the polarizer sheet or film that polarizes the light traveling through the LCD display panel to enhance the viewing experience. The elements depicted in FIG. 11 are not to scale. In this embodiment, the light being emitted by FIPEL panel 101 is polarized by virtue of emitting substrate 4 in FIG. 1 being a polarized substrate. In another embodiment, a polarized sheet or film may be adhered to the emissive side of substrate 4 of FIG. 1. In either embodiment, the light entering LCD display panel will be polarized so that the maximum amount of light will be passed by each pixel gate which itself is polarized. Polarization sheet or film 103 repolarizes the light leaving the LCD display panel so that it is correctly aligned to enhance the viewing experience. Also note that FIG. 11 depicts FIPEL panel 101 as having a smooth surface and LCD display panel 102 having a surface which is depicting the pixel gates contained within the panel. In the depiction the three structures are shown with separation between them. The actual embodiment would have the three structures in physical contact with no air gaps between them much as the structures are depicted in FIG. 10.

This technique can also be used with the new Samsung screen technology called Electro-wetting Displays which may have backlights or have only have reflective back surfaces that reflect ambient light. A FIPEL panel of the type shown in the embodiments can provide both. When the FIPEL panel is active with this type of display, the display is using a backlight. When the FIPEL panel is turned off, the reflective back surface of the FIPEL panel is reflective. This gives the Electro-wetting Display the best of both worlds.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended for cover any modification or alternatives which might be predictable to a person having ordinary skill in the art. For example, other sizes and thicknesses can be used. While the above discusses use of liquid crystal (LCD) as the spatial light modulator, this is intended to supplant other forms of SLMs as well.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display system, comprising a controller, receiving information indicative of a display;

a plurality of signal generators, producing outputs respectively indicative of said information indicative of the display;

an emissive body, formed of a light emitting material divided into areas, where the areas are driven by the signal generators, and where the emissive body emits different colors which are controlled by the driving by the signal generators, thereby producing different colors on different areas of its surface;

wherein the controller operates to control said signal generators to produce outputs which control the different colors on said different areas of the emissive body, and for each of a plurality of pixels, said controller produces signals to cause said emissive body to emit a first primary color output during a first time period for a controlled pixel, to emit a second primary color output during a second time period for said controlled pixel, and to emit a third primary color output during a third time period for said controlled pixel, wherein different primary color outputs are emitted from a same location on the emissive body at different times.

2. The display system as in claim 1, wherein at least one of the primary color outputs are produced for only a portion of one of the time periods, and at least one other of the primary outputs are produced for an entirety of another of the time periods.

3. The display system as in claim 1, wherein the controller operates to control said signal generators to produce a white color output during a fourth time period.

4. The display system as in claim 3, wherein said first time period, said second time period, and said third time period and said fourth time period are created one after another and are temporally adjacent to one another.

5. The display system as in claim 1, wherein said first time period, said second time period and said third time period are created one after another and are temporally adjacent to one another.

6. The display system as in claim 1, wherein the controller controls the signal generator to drive the emissive body to create a color based on the information indicative of the display, and also based on a white balance adjustment, where the color is at all times adjusted by said white balance adjustment.

7. The display system as in claim 1, further comprising a controllable spatial light modulator, having multiple individual controllable pixels, said multiple pixels being illuminated by said emissive body, and said pixels each modulating the light from said emissive body.

8. The display system as in claim 7, wherein said spatial light modulator is liquid crystal, forming a liquid crystal display.

9. The display system as in claim 7 wherein said spatial light modulator is composed of elements that are one of: TFT, VA, IPS, IGZO or an electrowetting display.

10. The display system as in claim 1, further comprising multiplexers that control each signal generator controlling colors of multiple ones of said different areas, by connecting said signal generator to said different areas.

11. The display system as in claim 1, wherein the display system is a television.

12. This display system as in claim 1 wherein the display system is in a portable computer.

13. The display system as in claim 12, wherein said portable computer is one of a tablet, cell phone, or PDA.

14. The display system as in claim 1, wherein said primary colors are red green and blue.

15. The display system as in claim 1, wherein the signal generator is a frequency generator, and said driving to create different colors comprises changing a frequency output of the signal generator to create said different colors, where a different frequency applied to said emissive body causes said emissive body to emit a different color.

16. A display system, comprising a controller, receiving information indicative of a display;

at least one signal generator, producing outputs respectively indicative of said information indicative of the display based on controlling by the controller;

an emissive body, formed of a sheet of light emitting material divided into areas, where the areas are driven by the at least one signal generators, and where the emissive body emits different colors depending on the driving by the at least one signal generator, thereby producing different colors on different areas of a surface of the emissive body;

wherein the controller operates to control said signal generators to produce outputs which control the different colors on said different areas of the emissive body, and for each of a plurality of pixels, said controller produces signals to cause said emissive body to emit a first primary color output during a first time period for a controlled pixel, to emit a second primary color output during a second time period for said controlled pixel, and to emit a third primary color output during a third time period, where the first, second and third primary color outputs are controlled based on said information indicative of the display and also based on compensating for a white balance, where the color emitted by the emissive body is at all times adjusted for said white balance.

17. The display system as in claim 16, wherein at least one of the primary color outputs are produced for only a portion of one of the time periods, and at least one other of the primary outputs are produced for an entirety of another of the time periods.

18. The display system as in claim 16, wherein the controller operates to control said signal generators to produce a white color output during a fourth time period.

19. The display system as in claim 18, wherein said first time period, said second time period, and said third time period and said fourth time period are created one after another and are temporally adjacent to one another.

20. The display system as in claim 18, wherein the controlling said signal generators comprises changing a frequency of the signal generator to create said different colors where a different frequency applied to said emissive body causes said emissive body to emit a different color.

21. The display system as in claim 16, wherein said first time period, said second time period and said third time period are created one after another and are temporally adjacent to one another.

22. A method of displaying information, comprising:

receiving information indicative of a display into a controller;

producing outputs from the controller respectively indicative of said information indicative of the display;

using said outputs to control at least one signal generator to control areas of a light emissive body, to emit different colors depending on an output of the at least one signal generator, thereby producing different colors on different areas of the emissive body;

said controlling comprising controlling said at least one signal generator to drive said emissive body to emit different colors on said different areas of the emissive body, and for each of a plurality of pixels, to emit a first primary color output during a first time period for a controlled pixel, to emit a second primary color output during a second time period for said controlled pixel, and to emit a third primary color output during a third time period, wherein different primary color outputs are emitted from a same location on the emissive body at different times.

23. The method as in claim 22, wherein at least one of the primary color outputs are produced for only a portion of one of the time periods, and at least one other of the primary outputs are produced for an entirety of another of the time periods.

24. The method as in claim 22, wherein the controller operates to control said signal generators to produce a white color output during a fourth time period.

25. The method as in claim 24, wherein said first time period, said second time period, and said third time period and said fourth time period are created one after another and are temporally adjacent to one another.

26. The method as in claim 22, wherein said first time period, said second time period and said third time period are created one after another and are temporally adjacent to one another.

27. The method as in claim 22, wherein the controller controls the signal generator to create an output that creates a color based on the information indicative of the display, and also based on a white balance adjustment, where the color emitted by said light emissive body is at all times adjusted by said white balance adjustment.

28. The method as in claim 22, further comprising controlling a controllable spatial light modulator, having multiple individual controllable pixels, said multiple pixels being illuminated by said emissive body, and said pixels each modulating the light from said emissive body.

29. The method as in claim 28, wherein said spatial light modulator is liquid crystal, forming a liquid crystal display.

30. The method as in claim 28 wherein said spatial light modulator is composed of elements that are one of: TFT, VA, IPS, IGZO or an electrowetting display.

31. The method as in claim 22, further comprising multiplexers that control each frequency generator controlling colors of multiple ones of said different areas, by connecting said signal generator to said different areas.

32. The method as in claim 22, wherein the method is carried out in a television.

33. This method as in claim 22 wherein the method is carried out in a portable computer.

34. The method as in claim 33, wherein said portable computer is one of a tablet, cell phone, or PDA.

35. The method as in claim 22, wherein said primary colors are red green and blue.

36. The method as in claim 22, wherein the at least one signal generator is a frequency generator, and said controlling the at least one signal generator comprises changing a frequency output of the frequency generator to create said different colors where a different frequency applied to said emissive body causes said emissive body to emit a different color.

* * * * *